W. MULLEE.

Assignor to the Vulcanite Jewelry Co.

BELTS.

No. 7,879. Reissued Sept. 11, 1877.

*Attest.*

Henry L. Fuller

William E. Wilson

*Inventor.*

William Mullee

UNITED STATES PATENT OFFICE.

WILLIAM MULLEE, OF TOUGH KENAMON, PENNSYLVANIA, ASSIGNOR TO THE VULCANITE JEWELRY COMPANY.

IMPROVEMENT IN BELTS.

Specification forming part of Letters Patent No. 154,270, dated August 18, 1874; Reissue No. 7,879, dated September 11, 1877; application filed June 4, 1877.

*To all whom it may concern:*

Be it known that I, WILLIAM MULLEE, of Tough Kenamon, in the county of Chester and State of Pennsylvania, have invented a new and valuable Improvement in Belts or Bands, which improvement is fully set forth in the following specification, reference being had to the accompanying drawing.

This invention has relation to ladies' belts or bands worn upon the person for use or ornament; and it consists in forming the bands of hard rubber or vulcanite, celluloid, elastic metal, or similar substances, and in slotting or perforating the same longitudinally with a series of holes, in which are interwoven cords or ribbons of silk or similar substance, which strengthen the band, secure the wearer against loss should it be broken, and it forms a pleasing and agreeable ornament.

Figure 1:
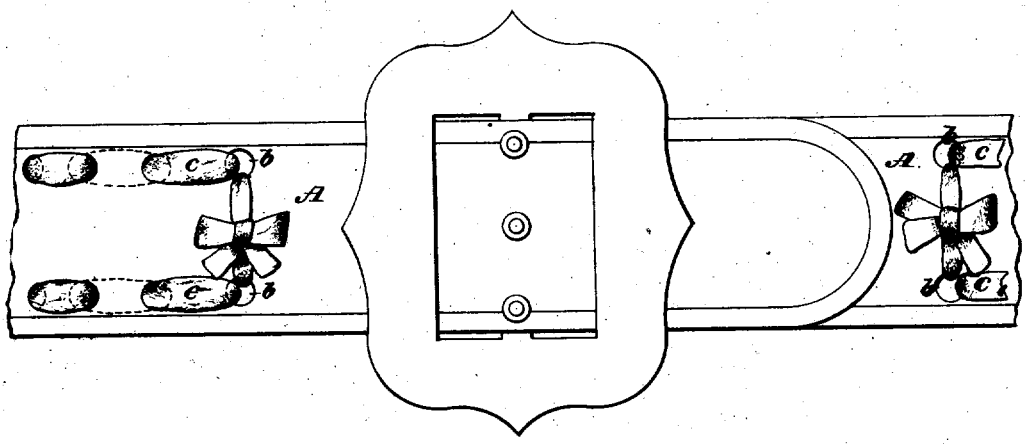
Figure 2:
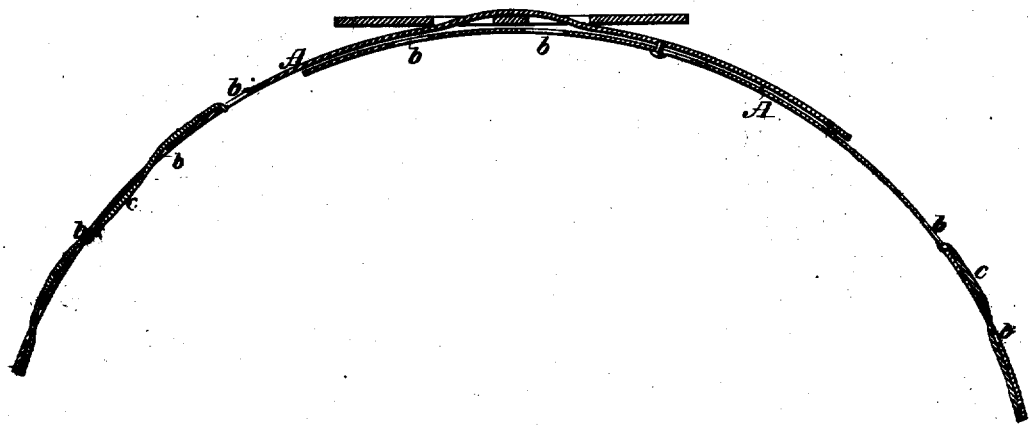

Figure 1 of drawing is a plan view of a belt or band showing my improvement. Fig. 2 is a sectional view.

In the drawings, A A designate the band of hard rubber or similar substance; *b b*, openings or slots in the band A, and *c c* the interwoven ribbon or cord.

In order to secure the desired flexibility combined with greatest strength and toughness, I cure bands made of india-rubber by a gradually-ascending scale of heat, as described in Letters Patent of the United States issued to me, dated March 31, 1868; but the hard rubber may be cured in other well-known methods.

It is obvious that my improved bands may be made of any size, so as to be adapted either to the waist as a belt or to the arm as a bracelet; and the openings or slots *b b* may be made in any desired form, style, or arrangement in the band A, and the bands may be made with or without clasps to secure the ends together.

What I claim as new is—

A belt or band of hard rubber or similar substance, provided with the interwoven cords or ribbons, substantially as specified.

WILLIAM MULLEE.

Witnesses:
HENRY L. FULLER,
WILLIAM E. WILSON.